Patented Apr. 12, 1938

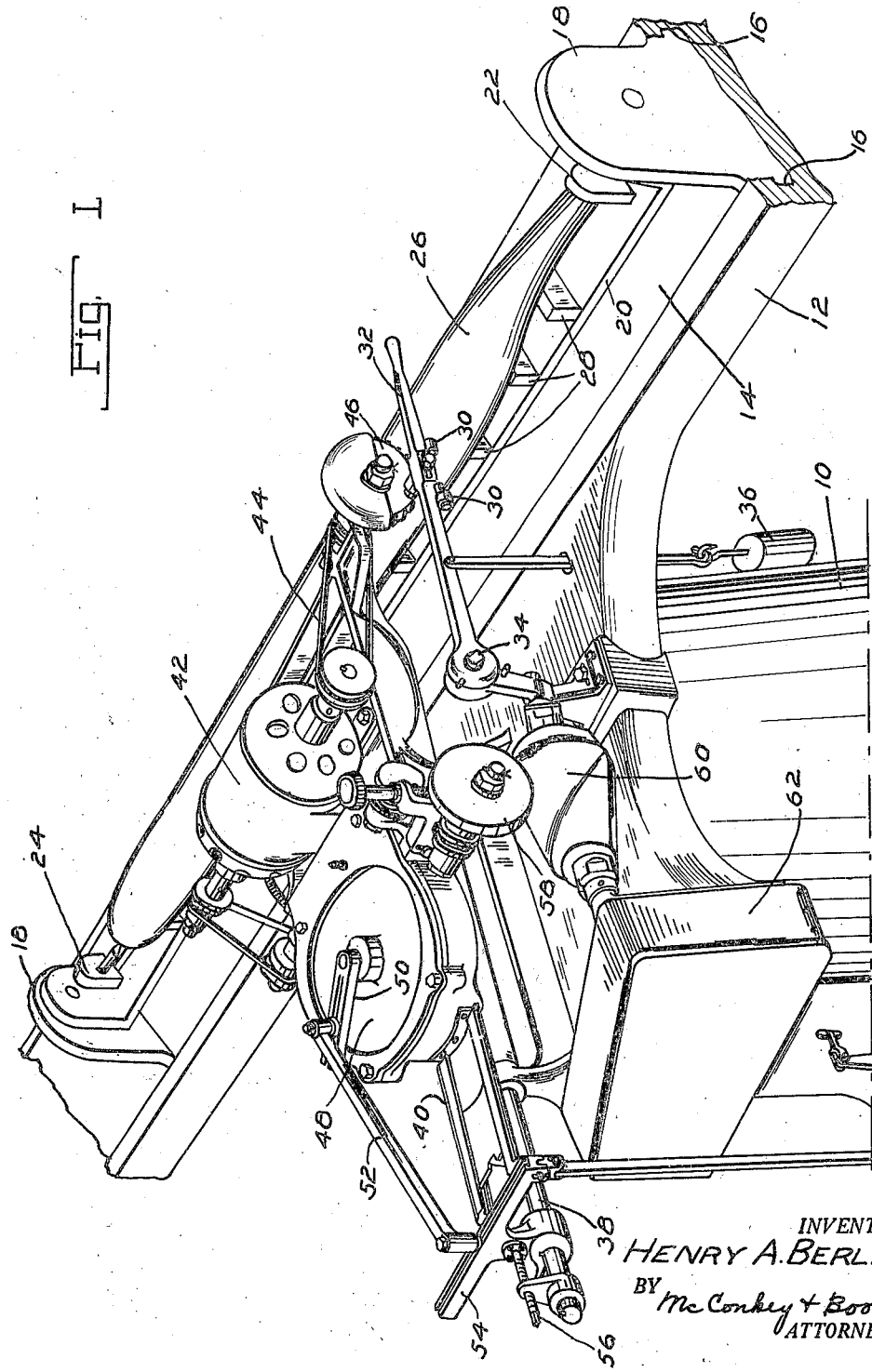

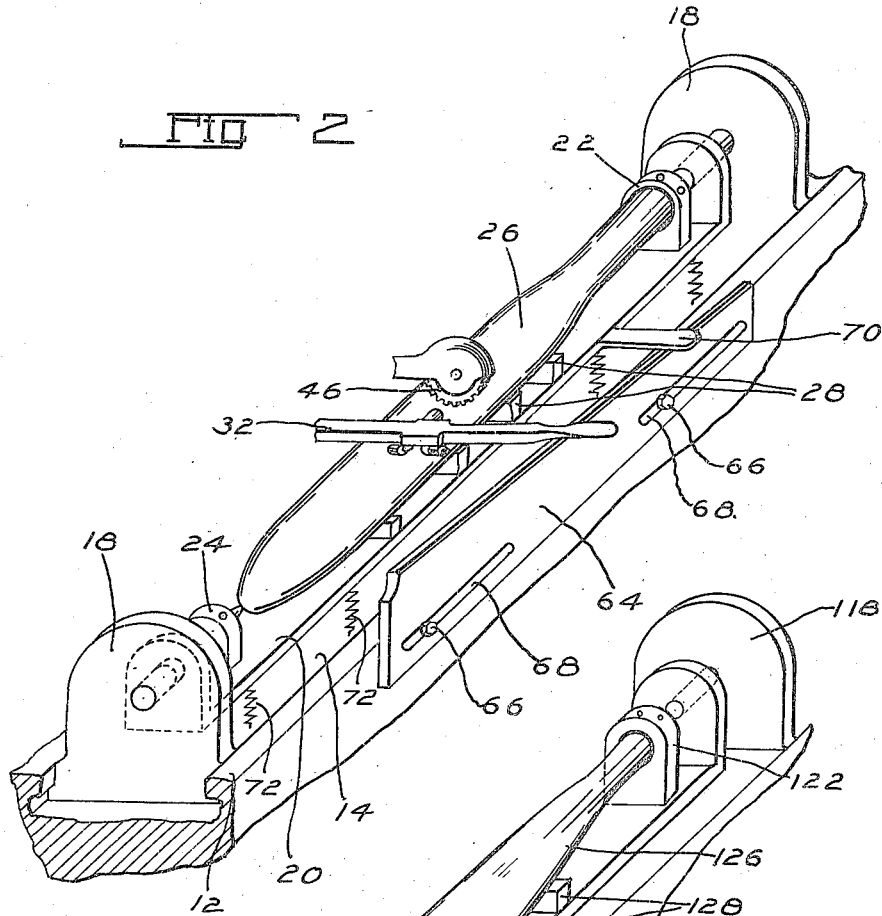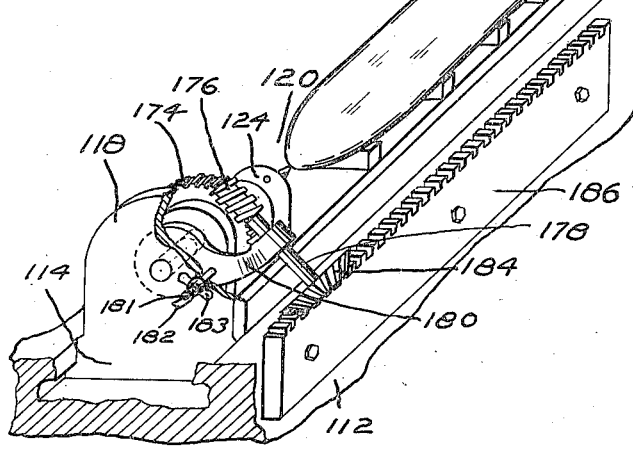

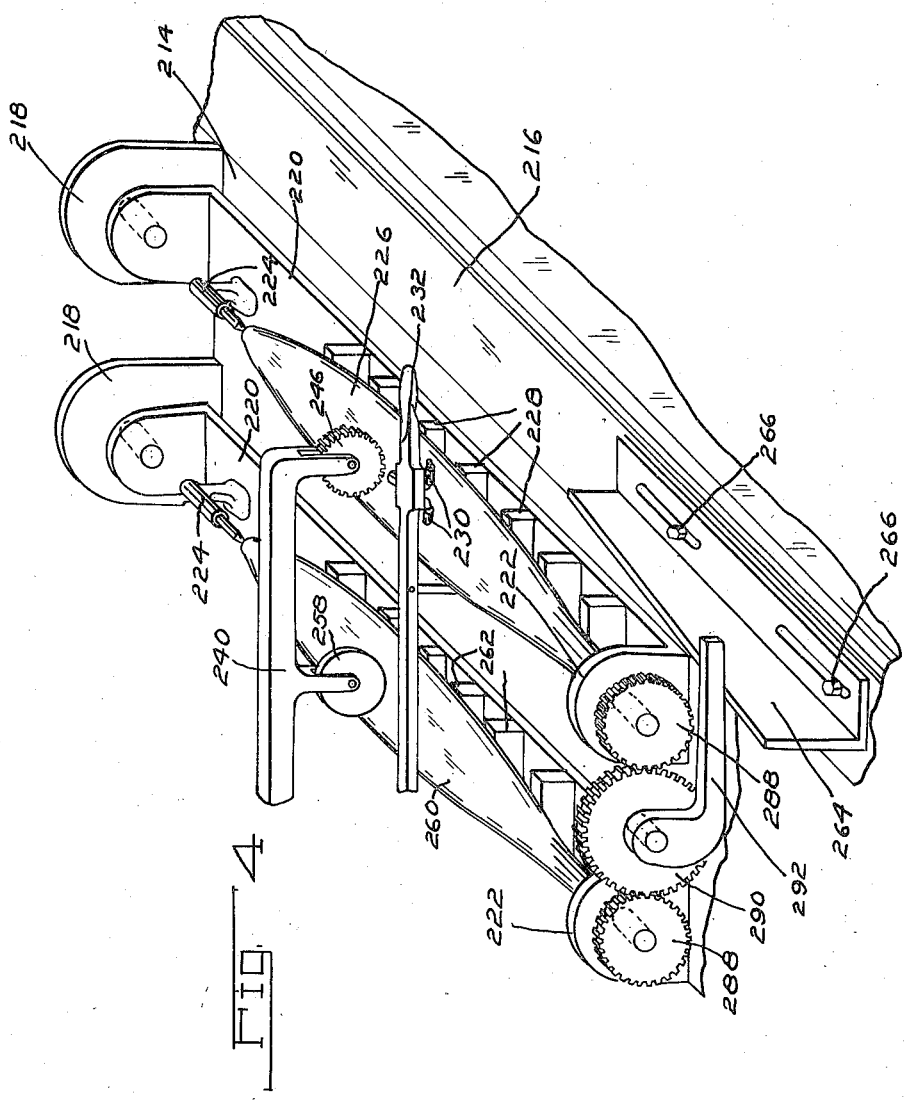

2,113,716

UNITED STATES PATENT OFFICE 2,113,716

FORMING MACHINE

Henry A. Berliner, Washington, D. C.

Application March 17, 1937, Serial No. 131,311

20 Claims. (Cl. 90—13.7)

This invention relates to forming machines and more particularly to machines for forming and finishing propeller blades.

One of the objects of the invention is to provide a forming machine in which work pieces of different shape or configuration may be formed from a single pattern. In the case of propeller blades, a plurality of blades of different pitches can be formed from a single pattern which gives to each of the several blades the same streamline section.

The invention may be embodied in a machine including a reciprocating cutter head or carriage carrying a pattern follower engageable with a pattern and a forming tool engageable with a work piece carried by a work support. The work piece is rotatably carried and is adapted to be turned as the work support moves to change the shape of the resulting product without changing the pattern.

One method of turning the work piece according to the invention includes the provision of a stationary cam engaged by a member on the work support to turn the work piece according to the shape of the cam as the work support moves. Another method employs a rack engaging a pinion carried by the work support and which is geared to the work piece and still another method utilizes a gear train between the pattern and work piece one element of which is turned according to movement of the work support to turn the work piece and pattern relatively.

Another feature of the invention relates to the supporting of the work piece by providing a rotatable table carrying a series of supporting members to engage and support the work piece between its ends. This is a very important feature, particularly for finishing long relatively thin pieces such as propeller blades since it provides proper support to eliminate flexing, chattering and the like. Preferably a pressure member is provided to hold the work piece firmly against the supports.

Other objects, advantages and novel features of the invention will be apparent from the following description when read in connection with the accompanying drawings, in which:

Figure 1 is a partial perspective view of a machine embodying the invention;

Figure 2 is a perspective view of the machine of Figure 1 at a different angle;

Figure 3 is a view similar to Figure 2 of a modified construction; and

Figure 4 is a partial perspective view of a different type of machine.

The machine illustrated in Figure 1 is of the type more fully described and claimed in the patent to Simmons No. 2,065,102 and includes a base or frame 10 terminating in a table-like extension 12 which slidably carries a work-supporting bed 14 as by means of grooves indicated at 16. A pair of rigid end members 18 are carried by the bed 14 and pivotally carry an elongated work supporting table 20. A headstock 22 and a tailstock 24 are mounted on the table 20 to carry a work piece or blank indicated at 26 with its axis coaxial with the pivotal axis of the table.

The work piece 26 may be a metal forging, casting or the like formed roughly in the shape of the finished article and as shown is in the shape of a blank for a propeller blade. In order to support it between its ends to prevent chattering or flexing and to insure an accurate finish, the table 20 carries a series of rigid supports 28 which may be adjustable, if desired, to fit the blank perfectly. The blank is held tightly against these supports by means of rollers 30 carried by a lever 32 which is pivoted on the frame at 34 and urged down against the blade by a weight 36.

The frame 10 carries an elongated pivot rod 38 extending at a right angle to the work support on which a cutter head or carriage 40 is slidably and rotatably mounted. The carriage carries an electric motor 42 connected by a belt 44 to a cutting or forming tool 46 which is adapted to form the work piece 26. The motor also drives suitable gearing in a gear box 48 which turns a crank arm 50 adjustably connected to a rod 52. At its opposite end the rod 52 is adjustably anchored in a cross member 54 which is keyed to the rod 38 and adjustable axially thereof by means of an adjusting screw 56. Adjustment of the rod 52 on the crank 50 determines the length of the stroke and consequently the amount of reciprocation of the carriage 40 and adjustment of the rod 52 in the cross member 54 enables an eccentric motion to be produced to move the carriage faster in one direction than in the other. By setting the screw 56 the range of reciprocation of the carriage can be adjusted.

A pattern follower 58 is mounted on the carriage 40 in a position to engage a rotatably mounted pattern or cam 60. As shown the cam 60 is rotatable about an axis at right angles to the work support and is driven by suitable gearing in a gear box 62 synchronously with longitudinal movement of the work supporting bed 14. Thus a different part of the pattern will be effective to engage the roller for each different part of the blank which is engaged by the cutter 46 and the contour and pitch of the blade being formed will be accurately determined by the contour of the cam 60.

In operation of the machine as described so far, the motor 42 turns the crank 50 and reciprocates the carriage 40 on the rod 38. At the same time the follower 58 rides on the pattern 60 to determine the radial position of the carriage about the rod 38, thus to move the cutter 46 up and down according to the shape of the pattern. As the carriage reciprocates it operates the gearing in the box 62 to turn the pattern 60 and at the same time to move the work supporting bed 14 along the table extension 12.

In order to form blades having the same sectional contour but with different degrees of twist or pitch, there is provided according to the present invention and as best seen in Figure 2, a cam 64 secured to the extension 12 by means of screws 66 extending through slots 68 in the cam. The table 20 carries a cam follower 70 engaging the cam and determining the radial position of the table in accordance with the cam. If desired suitable springs indicated at 72 may be provided to rock the table 20 in a direction to hold the follower 70 in engagement with the cam 64.

If the upper edge of the cam 64 is parallel to the extension 12 it will be apparent that no movement of the table 20 will occur and that a blade will be formed corresponding exactly to the shape of the pattern 60. However, if the edge of the cam 70 forms an angle with the extension, as shown, the table 20 will be rocked to turn the work piece 26 about its axis as the bed and table move. Thus a blade will be formed whose pitch is different than that of the pattern by an amount proportional to the cam angle. Different cams may be substituted to produce blades of different pitch or, if desired, an adjustable cam could be employed.

Figure 3 is a partial view illustrating a modified construction and parts therein corresponding to like parts in Figure 1 are indicated by the same reference numbers plus 100. In this form the table 120 carries a worm gear 174 meshing with a worm 176 whose shaft 178 is journaled in an adjustable bracket 180 which is pivoted on one of the end members 118 concentrically with the pivotal axis of the table 120. The bracket 180 is held in adjusted position by means of a threaded rod 181 carried thereby and extending through a slot 182 in the end member 118. A wing nut 183 threaded on the rod 181 serves to lock the bracket 180 to the end member 118.

The shaft 178 detachably carries a pinion 184 meshing with a rack 186 carried by the frame extension 112. It will be apparent that as the bed 114 moves, the worm 176 and gear 174 will be turned thereby to turn the table 120 about its pivotal mounting. To obtain different degrees of pitch, pinions of different sizes may be substituted at 184 to turn the worm 176 more or less as the bed and table move.

Figure 4 illustrates a machine of a slightly different type and which employs a duplicate of the blade to be formed as a pattern. As shown in this figure the machine includes a base or base extension 212 slidably carrying a bed 214 which is provided at its opposite ends with pairs of end members 218. A table 220 is pivotally supported by each pair of end members and each table has a headstock 222 and a tailstock 224. One table carries a workpiece 226 to be formed which is supported throughout its length by supports 228 on the table 220 and which is held down by rollers 230 on a suitable weighted lever 232. The other table 220 carries a finished blade 260 to serve as a pattern and may, if desired, be provided with supports 262 to support the blade throughout its length.

A carriage 240 is mounted for reciprocation across the work support and carries a follower 258 adapted to engage the pattern blade 260 and a cutter 246 to engage the work piece 226. The carriage 240 may be similar to the carriage 40 of Figure 1 and may carry suitable power means to drive the forming tool 246.

The tables 220 carry pinions 288 meshing with a gear 290 which is rotatably carried by the bed 214. An arm 292 is secured to the gear 290 and engages a cam 264 which is connected to the base 212 by suitable fastenings 266.

As the bed 214 moves along, the arm 292 rides on the cam 264 to turn one pinion 288 and its connected table 220 in one direction and the other pinion 288 and its connected table 220 in the other direction. Thus the work piece will be turned relatively to the pattern blade to form a blade having the same section as the pattern but a different pitch.

While several embodiments of the invention have been shown and described it will be apparent that many changes might be made and it is not intended that the scope of the invention shall be limited to the forms shown or otherwise than by the terms of the appended claims.

What is claimed is:

1. A forming machine comprising a cutter head, a pattern support, a work support, said cutter head being movable relatively to said pattern support and work support, means on said cutter head to engage a pattern on the pattern support thereby to guide the cutter head, a cutting tool on the cutter head to form a work piece on the work support, and means operated by movement of said supports relatively to the cutter head to move one of the supports relatively to the other.

2. A forming machine comprising a cutter head, a rotatable pattern support, a rotatable work support, said cutter head being movable lineally relatively to said pattern support and work support, means on said cutter head to engage a pattern on the pattern support thereby to guide the cutter head, a cutting tool on the cutter head to form a work piece on the work support and means operated by movement of said supports relatively to the cutter head to rotate one of the supports relatively to the other.

3. A forming machine comprising a carriage, a pattern follower and a forming tool carried by said carriage, a pattern engageable with said follower to guide the carriage, a work support movable relatively to said carriage to carry a work piece to be formed by said forming tool, means for moving the work support relatively to the carriage, and means operated by said movement of the work support to turn the work support relatively to the pattern.

4. A forming machine comprising a carriage, a pattern follower and a forming tool carried by said carriage, a pattern engageable with said follower to guide the carriage, a work support movable relatively to said carriage to carry a work piece to be formed by said forming tool, means for simultaneously moving the work support and the pattern relatively to the carriage, and means operated by said movement to turn the work support relatively to the pattern.

5. A forming machine comprising a longitudinally movable work support, a carriage reciprocable across said work support, a forming tool and a pattern follower carried by said carriage, a movably mounted pattern engageable with said follower to guide the forming tool, means for simultaneously moving the pattern and work support and means operated by longitudinal movement of the work support to turn a work piece carried thereby about its longitudinal axis.

6. A forming machine comprising a longitudinally movable work support, a carriage reciprocable across said work support, a forming tool and a pattern follower carried by said carriage, a movably mounted pattern engageable with said follower to guide the forming tool, means for simultaneously moving the pattern and work support, a stationary cam, and a member carried by the work support and engaging the cam to turn the work support as it is moved longitudinally.

7. A forming machine comprising a longitudinally movable work support, a carriage reciprocable across said work support, a forming tool and a pattern follower carried by said carriage, a movably mounted pattern engageable with said follower to guide the forming tool, means for simultaneously moving the pattern and work support, a stationary rack, and means including a pinion engaging said rack to turn the work support as it is moved longitudinally.

8. A forming machine comprising a longitudinally movable work support, a carriage reciprocable across said work support, means on the work support for rotatably carrying a work piece, a rotatably mounted pattern, a pattern follower on the carriage to engage said pattern to guide the carriage, a forming tool on the carriage to form said work piece, means for simultaneously rotating the pattern and moving the work support, and means operated by movement of the work support for turning said carrying means.

9. A forming machine comprising a longitudinally movable work support, a carriage reciprocable across said work support, means on the work support for rotatably carrying a work piece, a rotatably mounted pattern, a pattern follower on the carriage to engage said pattern to guide the carriage, a forming tool on the carriage to form said work piece, means for simultaneously rotating the pattern and moving the work support, a stationary cam, and a member engaging said cam and moved therealong by movement of the work support for turning said work piece relatively to the pattern.

10. A forming machine comprising a longitudinally movable work support, a carriage reciprocable across said work support, means on the work support for rotatably carrying a work piece, a rotatably mounted pattern, a pattern follower on the carriage to engage said pattern to guide the carriage, a forming tool on the carriage to form said work piece, means for simultaneously rotating the pattern and moving the work support, a stationary rack, and means including a pinion meshing with said rack and operated by movement of the work support for turning said work piece.

11. A forming machine comprising a longitudinally movable work support, a carriage reciprocable across said work support, means on the work support for rotatably carrying a work piece, a pattern rotatably mounted about an axis parallel to the direction of reciprocation of the carriage, a follower on the carriage engaging said pattern, a forming tool on the carriage to form the work piece, means for simultaneously moving the work support and rotating the pattern, and means operated by longitudinal movement of the work support for turning the work piece.

12. A forming machine comprising a longitudinally movable work support, a carriage reciprocable across said work support, means on the work support for rotatably carrying a work piece, a pattern rotatably mounted about an axis parallel to the direction of reciprocation of the carriage, a follower on the carriage engaging said pattern, a forming tool on the carriage to form the work piece, means for simultaneously moving the work support and rotating the pattern, a stationary cam, and a member moved along said cam by longitudinal movement of the work support to turn the work piece.

13. A forming machine comprising work support, a pattern support parallel to said work support, said supports adapted to carry a work piece and a pattern respectively, a carriage reciprocable across said supports, a follower and a forming tool carried by said carriage and engageable with said pattern and said work piece respectively, means for moving said supports lineally relatively to said carriage, and means operated by said lineal movement to turn the work piece and pattern relatively.

14. A forming machine comprising work support, a pattern support parallel to said work support, said supports adapted to carry a work piece and a pattern respectively, a carriage reciprocable across said supports, a follower and a forming tool carried by said carriage and engageable with said pattern and said work piece respectively, means for moving said supports lineally relatively to said carriage, a stationary cam, and a member engageable with said cam and moved therealong by said lineal movement for turning the work piece relatively to the pattern.

15. A forming machine comprising means for rotatably supporting a work piece, means for rotatably supporting a pattern on an axis parallel to the axis of the work piece, a carriage reciprocable transversely across said supporting means and carrying a follower engageable with the pattern and a forming tool for forming a work piece, means for moving said supporting means relatively to said carriage, and means operated by movement of the supporting means to turn the work piece relatively to the pattern.

16. A forming machine comprising means for rotatably supporting a work piece, means for rotatably supporting a pattern on an axis parallel to the axis of the work piece, a carriage reciprocable transversely across said supporting means and carrying a follower engageable with the pattern and a forming tool for forming a work piece, means for moving said supporting means relatively to said carriage, a stationary cam, and a member movable along the cam by movement of the supporting means to turn the work piece relatively to the pattern.

17. In a forming machine for propeller blades, having a movable work supporting bed and a cutter head reciprocable thereacross, work supporting means comprising a table rotatably mounted on said bed, means on said table to support the ends of a work piece, rigid supporting members on the table to engage and support a work piece intermediate its ends and means operable by movement of the bed to turn the table relative to the bed.

18. In a forming machine for propeller blades, having a movable work supporting bed and a cutter head reciprocable thereacross, work supporting means comprising a table rotatably mounted on said bed, means on said table to support the ends of a work piece, rigid supporting members on the table to engage and support a work piece intermediate its ends, means to engage a work piece to hold it firmly against said supporting members and means operable by movement of the bed to turn the table relative to the bed.

19. A machine for forming propeller blades comprising a movable work supporting bed, a cutter head reciprocable across said bed, a table rotatably mounted on said bed, means on the table to support the ends of a work piece, rigid supports carried by the table to engage and support a work piece intermediate its ends, a stationary member mounted adjacent the bed and table, and means movable with the bed and table and engaging said stationary member to rotate the table as the bed and table move.

20. A machine for forming propeller blades comprising a movable work supporting bed, a cutter head reciprocable across said bed, a table rotatably mounted on said bed, means on the table to support the ends of a work piece, rigid supports carried by the table to engage and support a work piece intermediate its ends, a stationary cam, and a member carried by the table and engaging said cam to rotate the table as the table and bed move.

HENRY A. BERLINER.